J. W. H. DEW.
PROCESS OF MANUFACTURING SOLID RUBBER OR LIKE TIRES AND TREADS OF PNEUMATIC TIRES.
APPLICATION FILED DEC. 30, 1912.
1,191,876. Patented July 18, 1916.
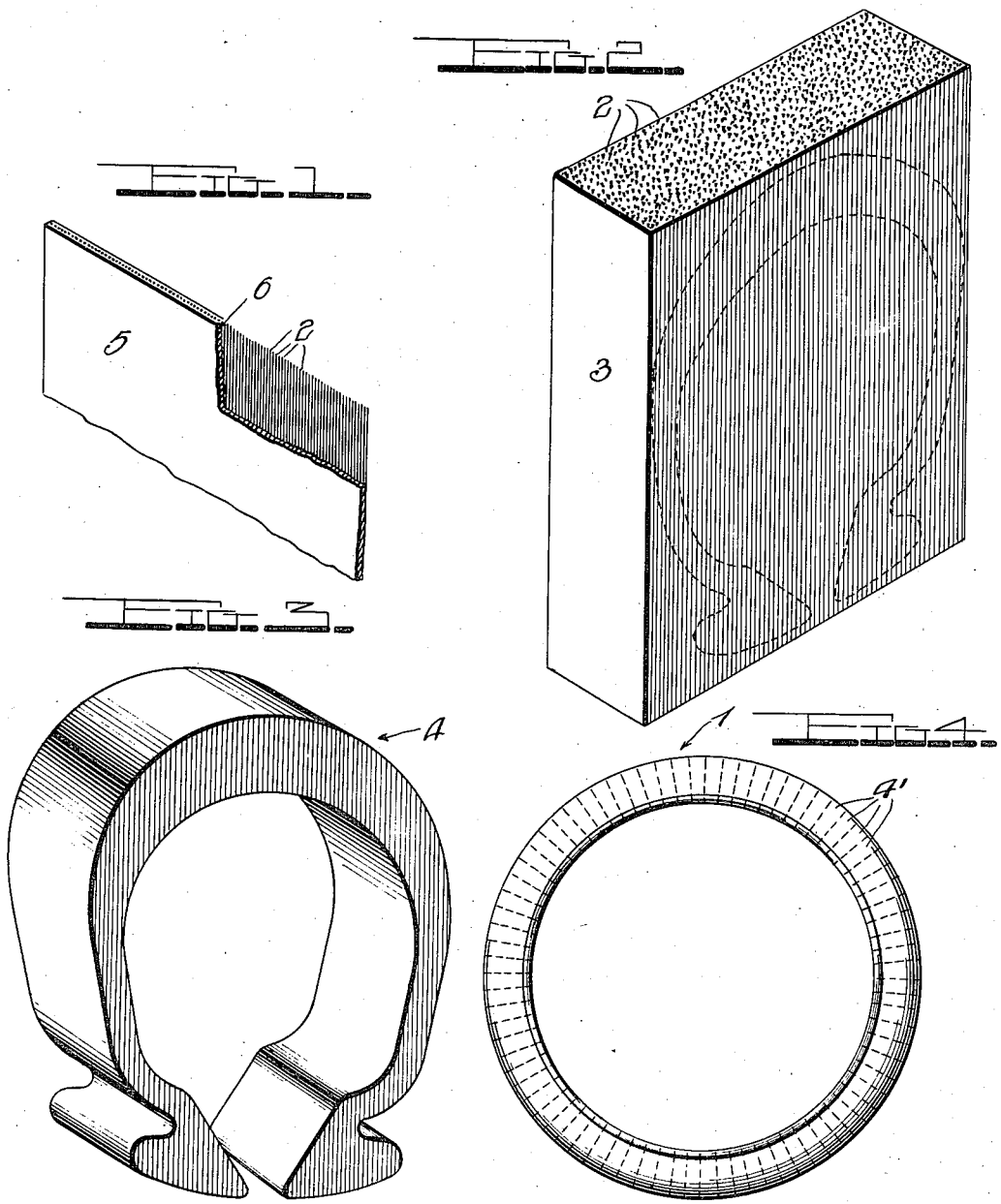
Witness
Chas. L. Griesbauer.
Inventor
John W. H. Dew
By H. B. Willson & Co.
Attorneys

UNITED STATES PATENT OFFICE.

JAMES WALTER HENRY DEW, OF LONDON, ENGLAND.

PROCESS OF MANUFACTURING SOLID RUBBER OR LIKE TIRES AND TREADS OF PNEUMATIC TIRES.

1,191,876.  Specification of Letters Patent.  Patented July 18, 1916.

Application filed December 30, 1912. Serial No. 739,405.

*To all whom it may concern:*

Be it known that I, JAMES WALTER HENRY DEW, a subject of the King of Great Britain and Ireland, and residing at 8 Laurence Pountney Hill, Cannon street, in the county of London, England, have invented certain new and useful Improvements in the Process of Manufacturing Solid Rubber or Like Tires and Treads of Pneumatic Tires, of which the following is a specification.

This invention relates to improvements in connection with the method of manufacturing solid rubber tires and treads of pneumatic tires of the type in which hairs or fibers are incorporated with the rubber and so placed as to present only their ends to the wearing surface.

The object of the present invention is to devise an improved method of forming solid rubber or like tires and the treads of pneumatic tires of the type referred to and the invention comprises a method which consists in forming thin fiber and rubber or rubber like strip, building up the tire from sections stamped therefrom of the desired shape and subsequently forming the tire or tread from a series of such sections which may be subsequently vulcanized or cured in the usual manner.

Figure 1 represents a detail perspective view with parts broken out of one of the elementary strips constructed in accordance with this invention; Fig. 2 is a perspective view of a block of material formed in accordance with this improved process; Fig. 3 is a perspective view of a shoe section formed from the material produced by this process; Fig. 4 is a side elevation of a tire constructed in accordance with this invention.

In carrying my invention into effect when constructing a solid tire shown in Fig. 4 or an outer casing or shoe for a pneumatic tire, I take suitable unwoven fibers 2 selected from either the animal or the vegetable kingdom and these I lay side by side in the direction of their long axes in such a manner as to produce strips 5 of fiber approximately only one fiber thick but of any desired width. These strips I pass through a solution of rubber or of rubber like substances or compounds in such a manner as to thoroughly impregnate the fibers and to entirely envelop the same with rubber or rubber-like substance 6. The strips 5 prepared in this manner are built up one upon another in such a manner that all the fibers are arranged in one direction and when a block 3 of suitable thickness is formed, sections 4 are punched or cut out to produce the exact shape of the tire required, the section shown in Fig. 3 and indicated in Fig. 2 in dotted lines being such as is employed for the formation of an outer tire casing although obviously solid tire sections indicated at 4' in Fig. 4 would be cut out in the same manner from block 3. These sections 4 or 4' in their turn are placed side by side on or in a suitable mold until the complete tire or tire shoes as the case may be is built up and in this form it is subsequently vulcanized or cured in any usual manner resulting in a solid tire or in a shoe formed from fibers incorporated and compounded with rubber or rubber-like substance and arranged so that they come in contact with the road at their ends only, that is, are arranged so that their long axes are approximately at right angles to the road surface at the point of contact between the road and the tire tread. With tires built up in this manner the resiliency is but little affected by the presence of the fibers which, however, considerably enhance the strength and durable qualities of the tire and the result is that the slight stretching of the tread, which is occasionally necessary when starting or meeting road obstructions is allowed for. Further, the fibers assist in improving the non-skidding properties of the tire.

In carrying my invention into effect when constructing pneumatic tire covers 1, as shown in Fig. 4 I proceed in a similar manner to that set out above but the stamped-out sections 4 shown in Fig. 3, instead of being placed in a mold, are placed upon the foundation casing of the pneumatic tire and when the whole is completed the sections adhere to one another owing to the fact that the rubber is in its unvulcanized condition and the cover is then placed in the usual mold and pressed and vulcanized according to the methods at present adopted.

Having now described my invention what I claim as new and desire to secure by Letters Patent is:—

1. A process for the manufacture of solid rubber or like tires and treads of pneumatic tires which consists in forming a number of thin fiber strips impregnating said strips with adhesive such as rubber, stamping therefrom sections of a shape corresponding to the transverse section of the finished tire and forming the tire or tread from a series of such sections side by side in the longitudinal direction of the tire with the fibers thereof extending in a plane at right angles to the road surface at the point of contact between the road and the tire tread, and subsequently vulcanizing or curing the whole.

2. A process for the manufacture of solid rubber or like tires and treads of pneumatic tires which consists in forming a number of thin fiber strips approximately one fiber thick, impregnating said strips with adhesive such as rubber, building the strips one upon another in such a manner that the fibers are arranged parallel to one another, stamping from the built up strips sections of a shape corresponding to the transverse section of the finished tire, forming the tire from a number of such sections laid in a suitable mold in the longitudinal direction of the tire with the fibers thereof extending in a plane at right angles to the road surface at the point of contact between the road and the tire tread, and subsequently vulcanizing the whole.

In testimony whereof I have signed my name to this specification in the presence of two subscribing witnesses.

JAMES WALTER HENRY DEW.

Witnesses:
WILLIAM BARTON,
ETHEL BURN.